No. 643,705. Patented Feb. 20, 1900.
F. D. WILLIAMS.
VEHICLE RUNNING GEAR.
(Application filed Jan. 26, 1899.)

(No Model.) 2 Sheets—Sheet 1.

Witnesses F. D. Williams, Inventor

By his Attorneys,

THE NORRIS PETERS CO., PHOTO-LITHO., WASHINGTON, D. C.

No. 643,705. Patented Feb. 20, 1900.
F. D. WILLIAMS.
VEHICLE RUNNING GEAR.
(Application filed Jan. 26, 1899.)
(No Model.) 2 Sheets—Sheet 2.
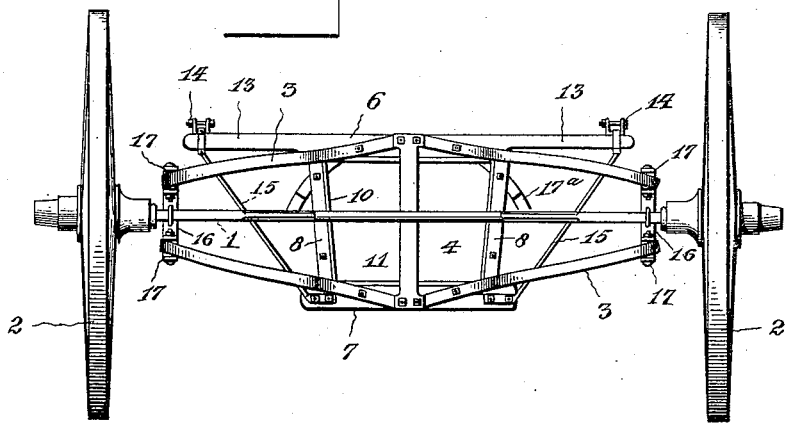
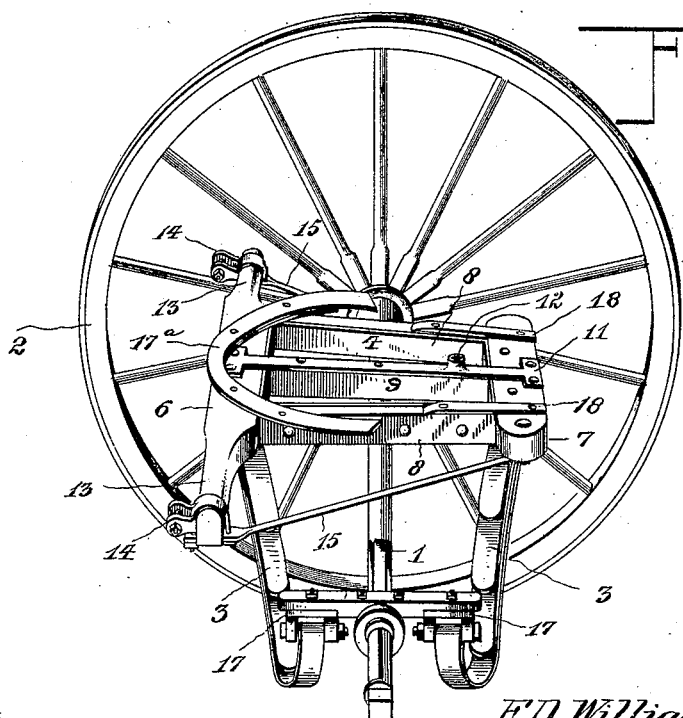
Witnesses
F. D. Williams, Inventor
By his Attorneys,

UNITED STATES PATENT OFFICE.

FREMONT D. WILLIAMS, OF BRATTLEBOROUGH, VERMONT.

VEHICLE RUNNING-GEAR.

SPECIFICATION forming part of Letters Patent No. 643,705, dated February 20, 1900.

Application filed January 26, 1899. Serial No. 703,469. (No model.)

*To all whom it may concern:*

Be it known that I, FREMONT D. WILLIAMS, a citizen of the United States, residing at Brattleborough, in the county of Windham and State of Vermont, have invented a new and useful Running-Gear, of which the following is a specification.

The invention relates to improvements in running-gear for vehicles.

The object of the present invention is to improve the construction of running-gear and to provide a simple, strong, and effective device designed to be arranged at the front of a vehicle which has a drop-body and in which it is impossible to employ a reach and to enable such a vehicle to be turned short without the springs coming in contact with the drop portion of the body.

The invention consists in the construction and novel combination and arrangement of parts hereinafter fully described, illustrated in the accompanying drawings, and pointed out in the claims hereto appended.

Figure 1:
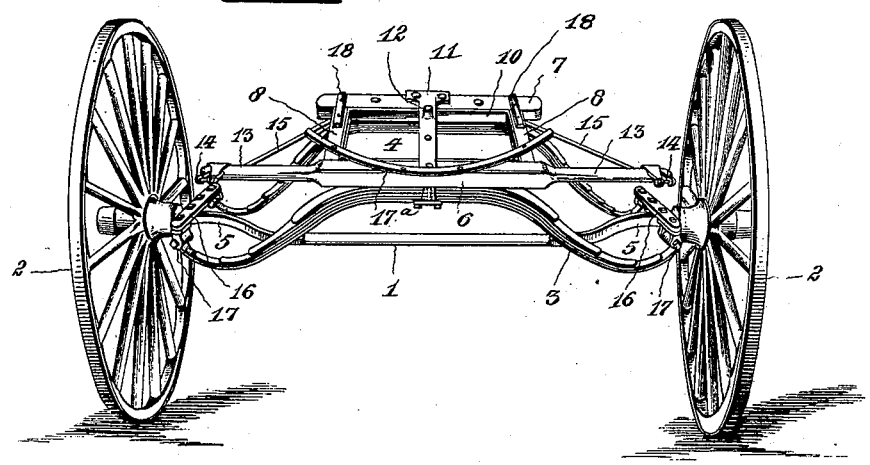
Figure 2:
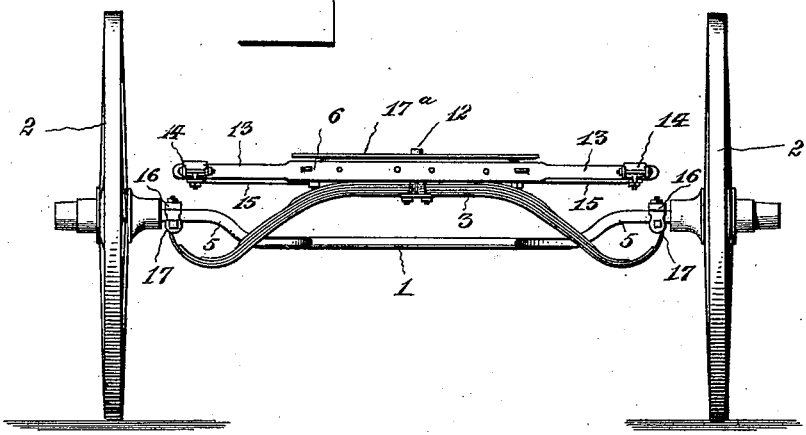

In the drawings, Figure 1 is a perspective view of a portion of a running-gear constructed in accordance with this invention. Fig. 2 is a front elevation of the same. Fig. 3 is a reverse plan view. Fig. 4 is a perspective view, one of the wheels being removed.

Like numerals of reference designate corresponding parts in all the figures of the drawings.

1 designates a front axle, having wheels 2 journaled on its spindles, and it is connected by springs 3 with a horizontal frame 4, which construction forms a truck for supporting the front of the body of a vehicle. The axle, which is constructed of metal, has a depressed central portion which is connected with the ends by upwardly-extending portions or bends 5, as clearly illustrated in Fig. 2 of the accompanying drawings.

The frame 4, which is substantially rectangular, is located at the center of the truck and consists of front and rear bars 6 and 7, rearwardly-converging side bars 8, and a central bar 9, located equidistant of the side bars 8. This frame, which is constructed of wood, is supported by a metal frame 10, secured to the inner edges of the front, rear, and side bars, as clearly illustrated in Fig. 1 of the accompanying drawings. The frame is further strengthened and enabled to support the front of a vehicle by means of a king-bolt iron 11, consisting of a longitudinal bar disposed over the central bar 9 and provided in rear of the axle with an eccentrically-arranged pin-bolt 12, whereby the truck is adapted to turn short without coming in contact with the drop portion of a vehicle-body.

The front transverse bar 6 is provided with reduced extensions 13, carrying thill or pole couplings 14, and supported by rearwardly-converging bracing-rods 15, extending from the thill-couplings to the rear transverse bar 7, which extends slightly beyond the side bars. The rear ends of the rods are flattened and bent at an angle to form attachment-plates, which are bolted or otherwise secured to the lower face of the bar 7, and the front ends of the rods are flattened to form clip or washer plates for the coupling devices 14.

The springs, which are arranged in pairs, converge toward the wheels and extend from the center of the running-gear to within a short distance of the spindles. The inner ends of the springs are bolted to the front and rear bars of the frame, and those bolts which are located at the extreme inner ends of the springs also pass through the terminals of the king-bolt iron, which is extended laterally at opposite sides, forming substantially T-shaped terminals, as clearly shown in Fig. 1. The springs extend downward and cross the axle near the inner terminals of the bends thereof, the outer portions of the springs being located beneath the axle, as clearly shown in Fig. 2, and the said outer ends are connected with the axle by means of supporting-bars 16, clipped at points between their ends to the axle, extending in advance and in rear of the same, and provided with shackles or hangers 17 to receive the ends of the springs. The springs by being arranged in this manner do not come in contact with the drop portion of a vehicle-body when the front truck is turned, and the open space between the sides of the frame and the wheels also furthers this result.

The frame of the truck is provided at its front with a curved bearing-bar 17ª, forming a fifth-wheel, and bearing-plates 18 are secured to the rear portion of the frame. As the center of the fifth-wheel is located in rear of the axle and the coupling devices are located in advance of the same, the tendency of the truck to rock is counteracted.

The invention has the following advantages: The truck which forms the front portion of a running-gear is simple and comparatively inexpensive in construction. It possesses great strength and durability, and it is adapted to support the front portion of a vehicle having a central drop portion which prevents the use of a reach. The springs and the rear portion of the front truck are adapted to clear the drop portion of the vehicle-body when the front truck is turned, and the king-bolt iron braces the truck at the inner ends of the springs and holds the same in proper position.

Changes in the form, proportion, and minor details of construction may be resorted to without departing from the spirit or sacrificing any of the advantages of this invention.

What is claimed is—

1. A device of the class described comprising a front axle, a frame located above the axle and having a king-bolt in rear of same for pivotally connecting said frame to a vehicle-body, thill-coupling devices on said frame in advance of the axle, and outwardly-converging springs connecting the front and rear portions of the frame with the axle and supporting the former so that it may turn beneath the vehicle-body, substantially as described.

2. A device of the class described comprising an axle, a frame located above the axle and embodying front and rear bars, outwardly-converging springs arranged in pairs and secured at their inner ends to the front and rear bars of the frame, the outer ends thereof being curved downward and crossing the horizontal plane of the axle, and cross-bars connecting the ends of said springs to each other and to the axle, substantially as described.

3. A device of the class described comprising an axle, a frame located above the axle and provided in advance of the axle with lateral extensions, thill-couplings on said extensions, rearwardly-converging braces having their forward ends formed into washer-plates to receive the pendent threaded ends of ordinary U-shaped thill-coupling clips and extending therefrom to the rear bar of the frame, and springs supporting the frame above the axle, substantially as described.

4. A device of the class described comprising an axle, a frame composed of side bars, front and rear bars, and a central bar, a metal supporting-frame arranged within the said frame, a longitudinal king-bolt iron located above the central bar and provided with a king-bolt disposed in rear of the axle, and the springs arranged in pairs and extending from the front and back of the frame to the ends of the axle, substantially as described.

5. A device of the class described, comprising an axle, a frame consisting of side bars, a rear bar connecting the rear terminals of the side bars, and a front bar extending laterally beyond the side bars, coupling devices mounted on the front bar at the ends thereof, braces extending from the terminals of the front bar to the back of the frame, the springs arranged in pairs and extending from the front and back of the frame to the ends of the axle, and the longitudinal king-bolt iron having an eccentrically-arranged king-bolt, substantially as described.

In testimony that I claim the foregoing as my own I have hereto affixed my signature in the presence of two witnesses.

FREMONT D. WILLIAMS.

Witnesses:
B. F. SCHWENK,
H. G. BARBER.